United States Patent [19]

Hatch

[11] 4,018,059
[45] Apr. 19, 1977

[54] CRYOGENIC FLUID TRANSFER JOINT EMPLOYING GASEOUS SEALS

[75] Inventor: Burton D. Hatch, Ballston Lake, N.Y.

[73] Assignee: General Electric Company, Schenectady, N.Y.

[22] Filed: Apr. 30, 1975

[21] Appl. No.: 573,170

[52] U.S. Cl. .................................. 62/55; 62/505; 277/15; 285/47; 285/DIG. 5; 310/54; 310/61
[51] Int. Cl.² ........................................ F17C 7/02
[58] Field of Search .......... 62/54, 55, 505; 310/54, 310/61; 285/47, DIG. 5; 277/15

[56] References Cited
UNITED STATES PATENTS

| | | | |
|---|---|---|---|
| 3,626,717 | 12/1971 | Lorch | 62/505 |
| 3,731,865 | 5/1973 | Wood | 277/15 |
| 3,831,381 | 8/1974 | Swearingen | 277/15 |
| 3,845,639 | 11/1974 | Smith, Jr. et al. | 62/505 |
| 3,922,573 | 11/1975 | Pluske | 310/54 |

OTHER PUBLICATIONS

A. Bejan, M.I.T. PhD. Thesis, *Improved Thermal Design of the Cryogenic Cooling System for a Superconducting Synchronous Generator*, Dec. 20, 1974 pp. 148–155, 165, 167.

Primary Examiner—William F. O'Dea
Assistant Examiner—Ronald C. Capossela
Attorney, Agent, or Firm—Marvin Snyder; Joseph T. Cohen; Jerome C. Squillaro

[57] ABSTRACT

Cryogenic liquid coolant is transferred from a stationary liquefier through a bayonet to the rotor of a superconducting generator using a cryogenic fluid transfer joint cantilevered on the collector end of the rotor. Pressure of the boil-off coolant is employed to prevent the liquid coolant from entering a relative-motion gap about the bayonet, while the boil-off coolant flows through the gap to reduce heating of the bayonet. Flow of noncryogenic gas is used to regulate flow of the boil-off coolant and to minimize contamination of the coolant by bearing lubricant.

9 Claims, 2 Drawing Figures

CRYOGENIC FLUID TRANSFER JOINT EMPLOYING GASEOUS SEALS

INTRODUCTION

This invention relates to electrical machines employing superconducting rotors, and more particularly to a method and apparatus for transferring coolant from a stationary source to such rotors.

In electrical generators having superconducting rotors, the windings are bathed in a pool of very cold liquefied gas, e.g., liquefied helium, which absorbs heat from the windings and consequently evaporates to its gaseous form. Typically the generator is paired with a turbine and the rotor of one is connected to that of the other. The portion of the generator rotor connected to the turbine rotor is the "driven" end and the portion at the opposite end of the generator is the "undriven" or collector end of the generator rotor.

It is necessary to provide means for connecting to the rotor winding pool the device which liquefies the coolant, both to supply coolant to the winding pool and to recover evaporated coolant for reliquefication. The windings rotate, while the liquefier is stationary and external of the generator. Accordingly, the supply of liquid coolant is connected to the conduits within the generator, which serve the winding pool, through a fluid transfer joint between rotating and nonrotating elements. Seals are provided to isolate the coolant from contamination by the rotor bearing lubricant, and to minimize leakage of the coolant between inlet and return gas streams, between multiple return gas streams, and to the environment. Such seals have heretofore comprised rotating and nonrotating elements which contact and rub upon one another. These seals must be replaced on a frequent basis, e.g., after each 300 hours of generator operation. Moreover, a system must be provided to bleed off a portion of the returning coolant gas stream from beside the seal adjacent the bearings, in order to prevent contamination of the coolant and the liquefier with bearing lubricant.

The relatively short life of a contacting or rubbing seal is due to wear which is increased by slight eccentricity in rotor rotation. Since cryogenic fluid transfer joints have conventionally been fixed on stable, stationary bases, any eccentric movement of the rotor does not correspondingly move the base on which the joint is mounted. Accordingly, the eccentric movement locally increases wear-producing rubbing between the rotating and nonrotating portions of the contacting seals of conventional cryogenic fluid transfer joints.

Helium cooling for superconductive rotor applications should preferably include a counterflow, vapor-cooling arrangement for maintaining incoming liquid helium at cryogenic temperatures. A liquefier cycle for cryogenic cooling, where liquid helium at 4.2° K is delivered to the rotor and gaseous helium at room temperature is returned to the liquefier, is also preferably included.

In a desirable helium cooling system for superconductive rotor applications, helium mass flow rates that can be supplied through the rotor should be independent of rotor speed, such that cooldown at low speed can be performed. The system should be capable of performing properly at different mass flow rates, and coolant flow should be controlled accurately such that the minimum required flow is supplied. For high efficiency, vapor supplied with the liquid, or released from it through any transport process, should also be used for cooling.

Safe operation of the helium transfer joint requires that leakage of helium through the joint be limited to gas only, and that subatmospheric pressures in the central transfer tube, which can cause excessive leakage rates of warm helium into the 4.2° K region and reduce the cooling capacity of cold helium, be prevented.

Transfer of liquid helium from a stationary liquefier to a generator rotor requires an interface connection for the stationary and rotating helium streams. A helium-tight transfer joint, mounted at the undriven end of the generator rotor, functions to deliver liquid helium, with a minimum of boil-off, from a stationary to a rotating reference frame, and to return room temperature, dry helium gas (in two separate streams) with an acceptably minimal level of contamination and pressure drop.

Some of the design requirements for helium transfer joints actually conflict with each other. Included among such requirements are long seal and bearing life vs. minimum contamination of the helium with bearing and seal lubricants, low vibration vs. low boil-off of the liquid helium due to conduction heat transfer in the conduit supports, and low radiation heat leak to the liquid helium vs. design simplicity.

The cryogenic fluid transfer joint described herein is comprised of rotating conduits or tubes contained in a rotating shaft affixed, as by bolting, to the hollow undriven end of the generator rotor. Stationary bearing and seal housings, and a stationary bayonet are also included. Liquid helium is delivered through the bayonet to rotating, liquid-inlet tubing. The bayonet is cooled by allowing boil-off gas to leak through a relative-motion gap surrounding the bayonet. A gaseous seal provides a means of controlling this leakage. Return gas from the rotor is contained in two streams and flows through ports in the shaft into the stationary housing. A gaseous seal between the two returning streams allows the streams to be externally valved independently if desired.

Pressurized, noncryogenically-cooled, gaseous helium is employed to regulate the flow of boiled-off helium through the bayonet relative-motion gap by introduction of the noncryogenic, gaseous helium into the region near the outermost (with respect to the rotor) end of the gap. The resulting increased pressure at the outermost end of the gap limits, to an optimum value, the return flow of helium through the gap, the optimum value being equal to the flow of boiled-off gas through the gap so as to prevent passage of liquid helium through the gap.

One object of the invention is to provide a joint for transferring coolant to and from the rotor of a superconductive generator, which joint is cantilevered on the collector end of the rotor to avoid seal wear.

Another object of the invention is to provide a joint for circulating coolant between a stationary supply of coolant and the rotor of a superconductive generator while assuring that the coolant returned to the supply for reliquefication is uncontaminated so as to avoid possible damage to cryogenic refrigeration system components.

Another object is to provide a more efficient method of transferring liquid coolant to a superconductive rotor.

In accordance with a preferred embodiment of the invention, coolant in liquid form is supplied to a conduit within the rotor of a superconducting generator through bayonet means contained in a cryogenic fluid transfer joint attached to the collector end of the rotor. The joint comprises a hollow shaft coupled to the rotor so as to be rotatable therewith. The conduit extends from the rotor into the hollow interior of the shaft, and the bayonet means penetrates into the interior of the conduit. An outer wall is disposed concentrically about, and spaced apart from, the bayonet means so as to define a relativemotion gap therewith. The outer wall is rigidly coupled to the conduit and rotatable in unison therewith. Warmed, gasified coolant from the interior of the conduit flows completely through the relative-motion gap at a rate controlled by means communicating with and pressurizing, the relative-motion gap, and flows in a direction opposite to the flow of liquefied coolant through the bayonet means, thereby helping to cool the bayonet means without unduly utilizing any liquefied coolant for this purpose.

In accordance with another preferred embodiment, an improved method of supplying liquefied coolant at cryogenic temperatures from a stationary coolant source to the rotor of a cryogenic electrical machine is provided. The coolant is supplied through a stationary bayonet into a conduit rotatable with the rotor and extending from the interior of the rotor into a hollow shaft rotatable with the rotor. The improved method comprises directing the flow of gasified coolant from the interior of the conduit about the bayonet in a direction opposite to the flow of liquefied coolant through the bayonet so as to employ the cooling capacity of the liquefied coolant to maintain the exterior of the bayonet at a low temperature and thereby limit heating of the liquefied coolant as it flows through the bayonet, and regulating the rate at which the gasified coolant flows past the bayonet exterior. The overall efficiency of transferring the liquid coolant to the rotor is thereby raised.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction the accompanying drawings in which:

DESCRIPTION OF TYPICAL EMBODIMENTS

Figure 1:
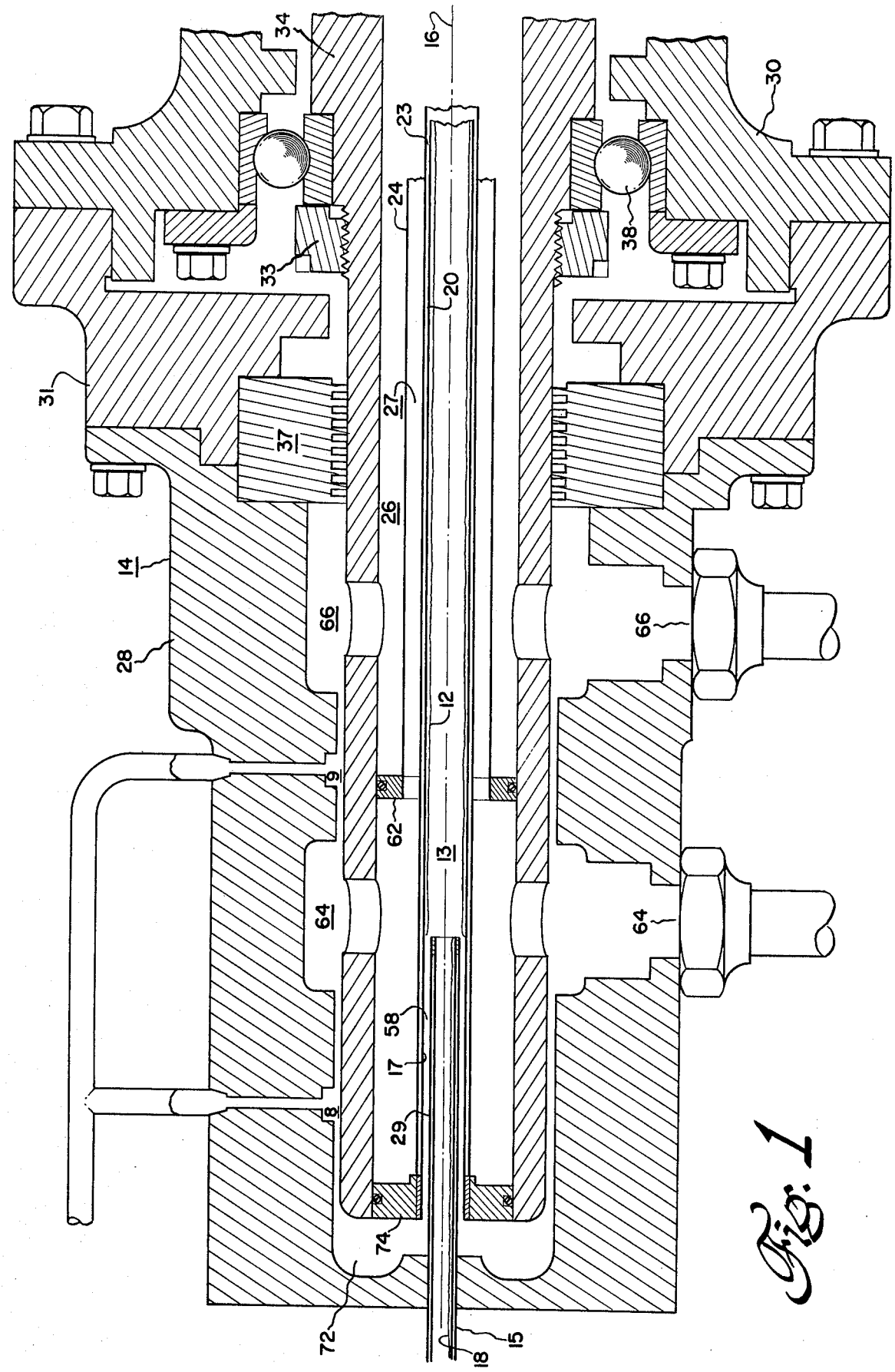
FIG. 1 is a longitudinal sectional view of one embodiment of the cryogenic fluid transfer joint of the instant invention.
Figure 2:
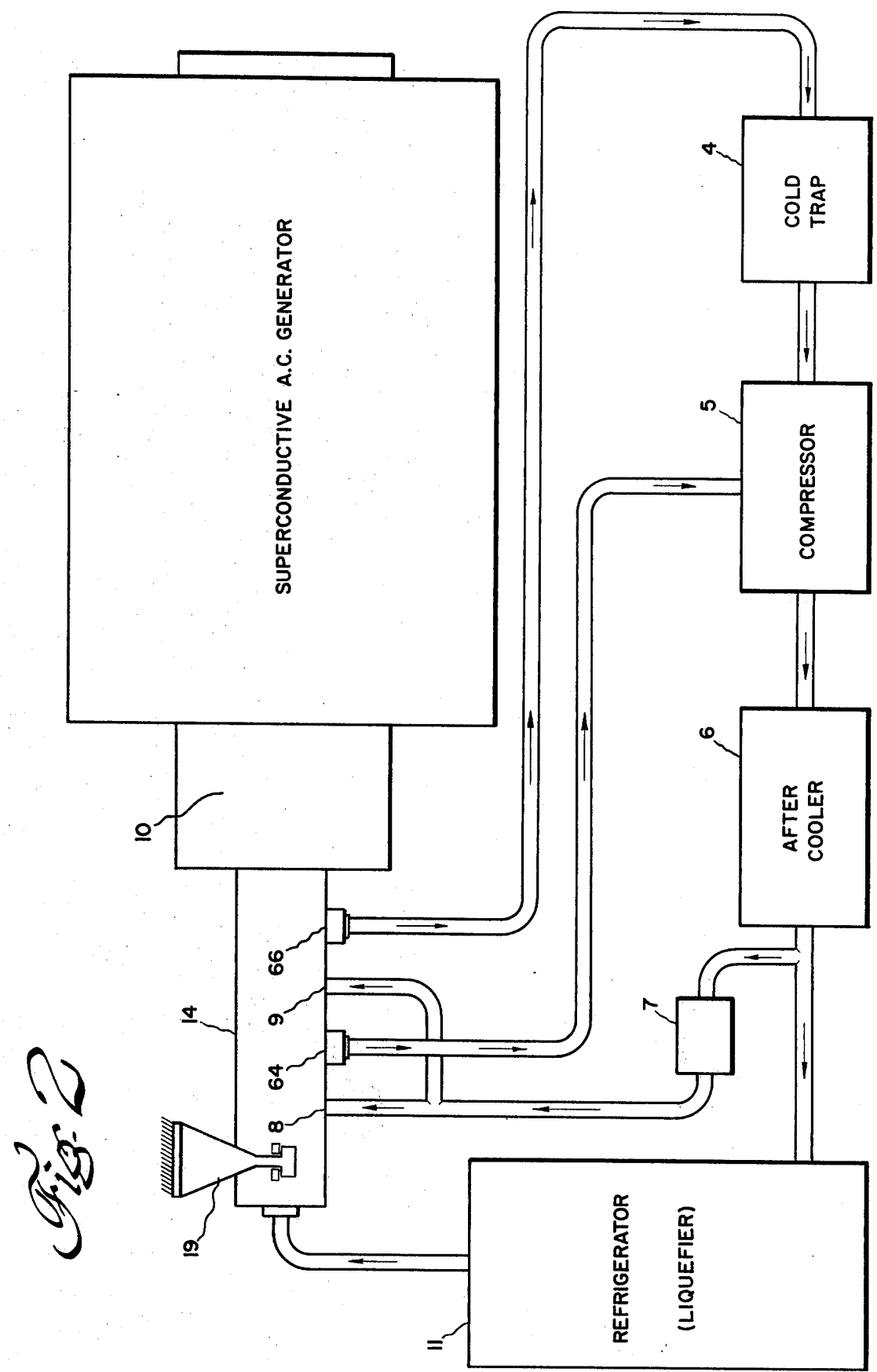
FIG. 2 is a block diagram of a refrigerating system for transferring coolant to and from conductive A.C. generator rotor.

FIG. 1 illustrates a portion of a fluid transfer joint 14 fastened to the nondriven or collector end of a superconductive generator rotor 10 (as shown in FIG. 2). Liquefied coolant 18 is supplied to joint 14 through a hollow, tubular bayonet 15 from a source 11 which may be a liquefier (as shown in FIG. 2). Evaporated coolant returning from the rotor leaves the transfer joint at ports 64, 66 and is recycled to the refrigerating system. The coolant usually employed is liquid helium at 4.2° K, by way of example, and may be supplied at slightly above atmospheric pressure, e.g., at 17 lbs, per square inch, to assure adequate delivery of coolant liquid through the joint.

Joint 14 is shown supported, in cantilever fashion, axially leftwards in FIG. 2 from the nondriven end of rotor 10. The joint may rest against a fixed support 19 which restrains the joint housing against rotation but permits the joint to vibrate with the rotor. The vibration may be accommodated either by keying the joint housing to support 19 to prevent rotation or, in those instances where permitted by both length of the cantilevered joint compared to its flexibility, and amount of vibration encountered, the housing may be secured to support 19.

Joint 14 provides an interface between a nonrotating liquid coolant source and a rotating system of coaxial conduits within rotor 10. As shown in FIG. 2, helium gas from a compressor 5, further cooled to just about cryogenic temperatures in an aftercooler 6 and supplied to a refrigerator 11, is liquefied in the refrigerator and furnished to joint 14. Additionally, noncryogenic helium gas is supplied from aftercooler 6 to pressure regulator 7 and thence furnished at predetermined pressure to two locations 8 and 9 in joint 14 on either side of exit port 64. Pure helium gas is returned from joint 14 through port 64 to compressor 5. Helium gas, possibly slightly contaminated with oil vapor, may be returned from joint 14 through port 66 to a cold trap 4 where it comes into contact with a surface maintained at liquid nitrogen temperatures. The oil vapor thus condenses out of the helium gas stream and the pure helium which remains is furnished to compressor 5 where it is combined with the helium gas received through port 64.

As evident from FIG. 1, delivery of helium gas to locations 8 and 9 develops helium pressures at those locations between the housing of joint 14 and a rotating, hollow shaft 34. The conduit system within shaft 34 includes a rotating conduit 20 for supplying liquid coolant to the rotor windings (not shown). In E. T. Laskaris et al. application Ser. No. 573,168, filed concurrently herewith and assigned to the instant assignee, a method and apparatus for supplying liquid coolant to the rotor windings are described and claimed.

A vacuum jacket 23 surrounds conduit 20 and is in turn surrounded by a conduit 24 for returning evaporated coolant from the collector end of the rotor. Evaporated coolant from the driven end of rotor 10 shown in FIG. 2 is forwarded to region 26 between conduit 24 and the inner surface of shaft 34, and flows through annulus 27 to joint 14. The returning evaporated coolant is collected in two streams, allowing cooling of the driven and collector ends of the rotor to be equalized by independently controlling flow of the gasified coolant outlet streams from joint 14.

Liquid coolant 18, which is ultimately supplied to the rotor, flows through vacuum-jacketed stationary bayonet 15 on rotor centerline 16 and is deposited on the inner surface of rotating tube 20 extending into the rotor, forming an annulus 12 of liquid on the tube wall as shown in FIG. 1. This liquid proceeds, under pressure, to the right toward the superconducting rotor, where it provides the necessary cryogenic cooling functions, and returns as boil-off vapor or noncryogenic helium gas constituting a vapor core 13 surrounded by annulus 12 of liquid. The liquid helium from rotating tube 20 is transferred to rotor 10. The evaporation rate of the liquid helium which cools the rotor windings (not shown) helps determine the gaseous helium return flow rates from rotor 10 through annulus 27 and central tube 20.

In the region where bayonet 15 discharges liquid helium into rotating conduit 20, heat unavoidably conducted into the joint by the stationary and rotating tubes causes some boil-off of the liquid helium, which is at a higher pressure at this location than at port 64. Consequently the gaseous helium flows from this location through a relative-motion gap 58 surrounding bayonet 15 and delimited by a rotating outer wall 17 and a stationary inner wall 29, through a chamber 72 axially beyond an annular plug 74 sealing the end of shaft 34, past location 8 and out through port 64 to be returned to the compressor. This flow intercepts heat being conducted into the joint along bayonet 15, reducing the total amount of heat reaching the region at the outlet or discharge end of bayonet 15, consequently reducing the amount of cryogenic helium boiloff. If limited only by operating clearances this flow would be excessive since the clearances must be sufficiently large to accommodate manufacturing tolerances. By introducing noncryogenic helium at location 8, however, the noncryogenic helium flow from chamber 72 combines with the noncryogenic helium flow supplied from the aftercooler to location 8 so as to provide a sufficient supply of gas (i.e., more gas than would be supplied solely by boil-off when the cryogenic liquid-gas interface remains near the outlet end of bayonet 15) between location 8 and exit port 64 to minimize total boil-off. The noncryogenic flow supplied from the aftercooler to location 8 thus functions as a gaseous seal, and consumption of cryogenic helium in cooling the necessarily cold elements of the joint is thereby minimized. Boil-off gas flow from the exit end of bayonet 15 through relative-motion gap 58 to chamber 72 is at an optimum value when it equals the boil-off due to conduction heat losses absorbed by the flow of cryogenic liquid as it passes through bayonet 15.

Similarly, by supplying noncryogenic helium to location 9, a split flow occurs from location 9 to exit port 64 and from location 9 to exit port 66. This split flow prevents boil-off gas coming from the lower end of the rotor through annulus 26 from flowing around the outer surface of shaft 34 and merging with boil-off gas coming from the collector end of the rotor through conduit 24, and hence functions as a gaseous seal. Not only does such isolation of helium gas streams facilitate independent adjustment of their respective flow rates, but it also prevents contamination of the stream from the collector end of the rotor by the stream from the driven end of the rotor which may contain bearing lubricant vapors in event such vapors have escaped from the region of bearings 38 into the stream from the driven end of the rotor. Possible damage to the cryogenic refrigeration system components due to such contamination is thereby avoided.

Gaseous helium pressure at the outlet of bayonet 15 prevents entry of liquid helium from the walls of rotating conduit 20 into relative-motion gap 58. In Laskaris application Ser. No. 573,169, filed concurrently herewith and assigned to the instant assignee, a similar result is instead achieved by reducing the inner and outer diameters of the relative-motion gap near the outlet end of the bayonet so that the relative-motion gap is not open to the liquid helium on the wall of the rotating conduit into which the bayonet discharges liquid helium.

Joint 14 includes a stationary housing assembly 28 fastened to a seal housing 31, in turn fastened to a bearing housing 30. Rotating tubular shaft 34 projects into housing assembly 28 and extends almost to the end thereof. Hollow shaft 34 is made of ferromagnetic material and is fastened to rotor 10 so that it rotates with the rotor.

A seal, such as cartridge seal 37, may be provided between seal housing 31 and rotating tubular shaft 34. A radial-contact ball bearing assembly is provided to journal rotating tubular shaft 34 with respect to stationary housing assembly 28, seal housing 31, and bearing housing 30. A seal 37, situated between seal housing 31 and shaft 34, serves to retain the bearing assembly lubricating oil. Bearing assembly 38 is held in place by a collar 33 threaded onto shaft 34 to abut the lower face of the bearing assembly. Because housing 28, 31 and 30 ride on shaft 34 and are free to move with the shaft runout, seal 37 is affected only by runout of the bearings in transfer joint 14 and is unaffected by runout of the rotor bearings (not shown). Those skilled in the art will recognize that the ball bearings could be replaced by oil film bearings to achieve longer lifetime, if desired.

The size of relative-motion gap 58 is chosen from consideration of convection loops which develop therein. An analysis of the convection loop heat leak around the bayonet shows that the contribution to bayonet heat by this mode of mode of heat transfer should not be significant for the chosen gap size. The gap is therefore limited to a size which limits the contribution to bayonet heat by this mode of heat transfer to an insignificant amount.

Vacuum jacket 23 around coolant supply tube 20 terminates at the same axis location as the termination of coolant supply tube 20, and both vacuum jacket 23 and coolant supply tube 20 are sealed and supported with respect to shaft 34 by an annular plug 74. Coolant supply tube 20 is supported with respect to vacuum jacket 23 by tube supports (not shown).

Conduit 24 for returning coolant gas from the collector end of the rotor extends axially leftwards to a point where a support ring 62 seals and supports conduit 24 with respect to rotating tubular shaft 34. Coolant gas returning through annulus 27 from the windings at the collector end of the rotor passes out through port 64 of housing assembly 28 and is collected for reliquefication and reuse.

Coolant gas returning through annulus 26 from the driven end of the rotor passes out of rotating tubular shaft 34 through port 66. Relative cooling of the driven and collector ends of rotor 10 may thus be equalized by appropriate relative adjustment of the helium flow exiting ports 64 and 66, as by valve adjustments in outlet conduits communicating with these ports.

The presence of cartridge seal 37 serves to prevent, or at least minimize, escape of any lubricant vapors in the region of bearings 28 into the stream of vapor returning through annulus 26 from the driven end of the rotor. Any oil vapor that might seep past seal 37 and enter the gap between shaft 34 and housing assembly 28 is swept out in the stream of gaseous coolant exiting through port 66 and is subsequently removed from the coolant in a cold trap. This assures that the gaseous coolant exiting through port 64 remains uncontaminated by lubricant vapors. As an alternative construction, seal 37 may be eliminated if the flow from location 9 toward port 66 is maintained sufficiently high so that entrainment of any oil vapors in the noncryogenic helium occurs only in the stream passing through exit port 66, again assuring that the helium passing through exit port 64 is uncontaminated. As another alternative, noncryogenic gas could be furnished to a location between shaft 34 and housing assembly 28 situated between seal 37 and exit port 66 so as to completely isolate boil-off gas exiting through port 66 from any possible contamination by lubricant vapors emerging from seal 37.

The foregoing describes a joint for transferring coolant to and from the rotor of a superconductive generator, which joint is cantilevered from the collector end of the rotor to avoid seal wear. The joint permits such transfer without use of rubbing seals and, accordingly, exhibits an extended useful lifetime. The transfer of coolant in this fashion is accomplished with high efficiency.

While only certain preferred features of the invention have been shown by way of illustration, many modifications and changes will occur to those skilled in the art. It is, therefore, to be understood that the appended claims are intended to cover all such modifications and changes as fall within the true spirit of the invention.

What I claim as new and desire to secure by Letters Patent of the United States is:

1. In cryogenic apparatus including a rotor wherein the interior portion thereof is bathed in liquefied coolant at cryogenic temperatures, a joint for supplying said liquefied coolant to a conduit within said rotor rotating in unison with said rotor, said joint comprising:
   a hollow shaft coupled to said rotor so as to be rotatable therewith, said conduit extending from said rotor into the hollow interior of said shaft;
   stationary bayonet means penetrating into the interior of said conduit and delivering said liquefied gas into the interior of said conduit;
   an outer wall disposed concentrically about, and spaced apart from, said bayonet means so as to define a relative-motion gap therewith, said outer wall being rigidly coupled to said conduit and rotatable in unison therewith;
   first means gaseously communicating with said relative-motion gap and facilitating flow of gasified coolant from the interior of said conduit completely through said gap in a direction opposite to flow of said liquefied coolant through said bayonet means to help cool said bayonet means; and
   second means gaseously communicating with said relative-motion gap to regulate the flow of gasified coolant through said relative-motion gap.

2. The apparatus of claim 1 including a stationary housing assembly, said hollow shaft and said conduit therein penetrating into said housing assembly from one side thereof and said bayonet means penetrating into said housing assembly from the opposite side thereof.

3. The apparatus of claim 1 wherein said means to regulate the flow of gasified coolant through said relative-motion gap includes a region of increased gas pressure in said first means to limit flow of said gasified coolant from said relative-motion gap.

4. The apparatus of claim 2 wherein said means to regulate the flow of gasified coolant through said relative-motion gap includes a region of increased gas pressure in said first means to limit flow of said gasified coolant from said relative-motion gap.

5. The apparatus of claim 4 wherein said joint is supported in cantilever fashion from said rotor, said apparatus further including a source of noncryogenic gas communicating with said region of increased gas pressure in said first means to maintain said pressure, and means keying said housing assembly to prevent rotation thereof while said shaft is rotating.

6. In the method of supplying liquefied coolant at cryogenic temperatures from a stationary coolant source to the rotor of a cryogenic electrical machine wherein said liquefied coolant is supplied through a stationary bayonet into a conduit rotatable with said rotor and extending from the interior of said rotor into a hollow shaft rotatable with said rotor, the improvement comprising:
   directing a continuous flow of gasified coolant from the interior of said conduit about said bayonet in a direction opposite to the flow of said liquefied coolant through said bayonet so as to employ the cooling capacity of said gasified coolant to maintain the exterior of said bayonet at low temperature and thereby limit heating of said liquefied coolant flowing through said bayonet; and
   regulating the rate at which said gasified coolant flows past the exterior of said bayonet.

7. The method of claim 6 including the steps of rotating said hollow shaft inside a housing assembly surrounding said shaft and spaced apart therefrom by a narrow gap between said shaft and said housing assembly sufficient to permit relative rotation therebetween, and directing said gasified coolant from the exterior of said bayonet toward said narrow gap.

8. The method of claim 7 including the step of altering pressures at at least one location in said narrow gap so as to restrict flow of said gasified coolant through said gap.

9. The method of claim 8 wherein the gap of altering pressures at at least one location in said narrow gap comprises introducing noncryogenic gas into said narrow gap at said location.

* * * * *